United States Patent [19]
Fujiwara et al.

[11] Patent Number: 4,517,349
[45] Date of Patent: May 14, 1985

[54] PROCESS FOR THE PRODUCTION OF P-VINYL PHENOL POLYMER

[75] Inventors: Hiroshi Fujiwara; Hatsutaro Yamazaki, both of Saitama; Kazuo Ozawa, Ibaraki, all of Japan

[73] Assignee: Maruzen Oil Company, Limited, Osaka, Japan

[21] Appl. No.: 548,255

[22] Filed: Nov. 2, 1983

[30] Foreign Application Priority Data

Nov. 4, 1982 [JP] Japan ................................. 57-194449

[51] Int. Cl.$^3$ .......................... C08F 4/70; C08F 12/24
[52] U.S. Cl. ..................................... 526/313; 526/176; 526/192; 526/212
[58] Field of Search ................ 526/313, 212, 176, 192

[56] References Cited

U.S. PATENT DOCUMENTS

| 3,502,629 | 3/1970 | Matthews | 526/212 |
| 3,842,019 | 10/1974 | Kropp | 526/313 |
| 3,959,240 | 5/1976 | Console et al. | 526/313 |
| 4,376,839 | 3/1983 | Malin | 526/212 |
| 4,413,108 | 11/1983 | Janssen | 526/313 |

Primary Examiner—Joseph L. Schofer
Assistant Examiner—Peter F. Kulkosky
Attorney, Agent, or Firm—Sughrue, Mion, Zinn, Macpeak and Seas

[57] ABSTRACT

A process for the production of a p-vinyl phenol polymer which comprises polymerizing p-vinyl phenol in the presence of (a) phenols that do not have any unsaturated side chains and (b) a polymerization accelerator; wherein water and iron are present in the polymerization reaction system so as to control formation of low molecular weight by-products which damage properties of the resulting p-vinyl phenol polymer.

12 Claims, No Drawings

PROCESS FOR THE PRODUCTION OF P-VINYL PHENOL POLYMER

FIELD OF THE INVENTION

The present invention relates to a process for the production of a p-vinyl phenol polymer. More specifically, the present invention relates to a process for producing a p-vinyl phenol polymer having a low content of low molecular weight by-products; said process comprises polymerizing p-vinyl phenol in the presence of (a) phenols that do not have any unsaturated side chains and (b) a polymerization accelerator, so as to control formation of low molecular weight by-products.

BACKGROUND OF THE INVENTION

Processes for the production of p-vinyl phenol which comprise (1) dehydrating p-acetoxyphenyl-methyl carbinol; (2) decomposing p-hydroxycinnamic acid by decarbonation; (3) decomposing bisphenol ethane; and (4) dehydrogenating p-ethyl phenol, etc., are well known.

However, the crude p-vinyl phenol obtained from the above-described processes contains a large amount of impurities such as phenols that do not have any unsaturated side chains, e.g., phenol, cresol or ethyl phenol, etc. Further, it is very difficult to obtain p-vinyl phenol having high purity by purification of the resulting crude p-vinyl phenols.

It has been known that p-vinyl phenol will polymerize even in the presence of phenols that do not have any unsaturated side chains such as phenol, cresol or ethyl phenol, etc. A process for the production of a p-vinyl phenol polymer which comprises polymerizing crude p-vinyl phenol containing such phenols as impurities without carrying out purification of the crude p-vinyl phenol is disclosed in Japanese Patent Publication (unexamined) No. 13694/78.

It has also been known that both phenols that do not have any unsaturated side chains and water serve as molecular weight regulators for the desired polymer when carrying out polymerization of p-vinyl phenol. A process which comprises polymerizing p-vinyl phenol using such phenols or water as a molecular weight regulator to obtain a p-vinyl phenol polymer having a desired molecular weight is disclosed in Japanese Patent Publication (unexamined) No. 44609/82.

The above-described processes for the production of a p-vinyl phenol polymer which comprise polymerizing p-vinyl phenol in the presence of phenols that do not have any unsaturated side chains are not satisfactory for the following reasons. If phenols that do not have any unsaturated side chains, such as phenol, cresol or ethyl phenol, etc., are present in the polymerization reaction system when carrying out polymerization of p-vinyl phenol, low molecular weight by-products, e.g., dimers or trimers, having the form that the benzene nucleus of the phenols that do not have any unsaturated side chains are substituted by p-vinyl phenol, are formed in addition to the polymer of p-vinyl phenol. Thus, these low molecular weight by-products are contained in the desired p-vinyl phenol polymer.

The p-vinyl phenol polymer has been viewed as a functional high polymer material since its reactivity, due to its phenolic hydroxyl groups, is different from that of polystyrene. Further, its properties are different from those of phenol resin due to the vinyl bonds. However, if the low molecular weight by-products, as described above, are present in the p-vinyl phenol polymer, they have a bad influence upon the properties of the p-vinyl phenol polymer, for example, they cause deterioration of heat resistance. Accordingly, it is necessary to minimize the content of the low molecular weight by-products in the p-vinyl phenol polymer.

In order to reduce the content of the low molecular weight by-products in the resulting p-vinyl phenol polymer, it is necessary, when carrying out the polymerization reaction, to prevent side reactions that form the low molecular weight by-products or to remove the low molecular weight by-products from the polymer after conclusion of the polymerization reaction.

One process for removing the low molecular weight by-products after conclusion of the polymerization reaction comprises carrying out reprecipitation or washing with a solvent which does not dissolve the polymer but dissolves the low molecular weight by-products. Another process comprises removing the low molecular weight by-products by reduced pressure distillation.

However, the above-described processes are complicated and expensive because the physical properties of the low molecular weight by-products are similar to those of low molecular weight fractions of the desired polymers. Further, formation of the low molecular weight by-products causes a loss of p-vinyl phenol.

Accordingly, it is desired to control the side-reactions that form the low molecular weight by-products when carrying out the polymerization reaction to such an extent so that these by-products do not interfere with the practical use of the resulting polymer.

SUMMARY OF THE INVENTION

As a result of studies on the control of the side-reactions that form the low molecular weight by-products when polymerizing p-vinyl phenol, it has been determined that water not only has the effect of controlling the molecular weight of the polymer but also has the effect of preventing the formation of the low molecular weight by-products. Furthermore, it has been determined that if iron is present together with water in the reaction system, formation of the low molecular weight by-products is greatly reduced as compared to when water alone is present. Thus, a polymer, in which the content of the low molecular weight by-products is reduced to an extent such that they do not cause a practical problem, can be obtained without requiring the removal of the low molecular weight by-products from the polymer.

An object of the present invention is to provide a process for controlling the formation of the low molecular weight by-products when producing a p-vinyl phenol polymer by polymerizing p-vinyl phenol in the presence of (a) phenols that do not have any unsaturated side chains and (b) a polymerization accelerator.

Another object of the present invention is to provide a process for the production of a p-vinyl phenol polymer which has a reduced content of low molecular weight by-products.

A further object of the present invention is to provide a process whereby a p-vinyl phenol polymer having a reduced content of low molecular weight by-products and good properties is obtained without requiring a complicated and/or expensive treatment for removing the low molecular weight by-products.

The above-described objects have been met by the process of the present invention which comprises polymerizing p-vinyl phenol in the presence of (a) phenols that do not have any unsaturated side chains and (b) a polymerization accelerator; wherein said polymerization is carried out in the presence of water and iron.

DETAILED DESCRIPTION OF THE INVENTION

In the present invention, either purified pure p-vinyl phenol or crude p-vinyl phenol containing phenols such as phenol, cresol or ethyl phenol, etc., as impurities, prepared by the above-described processes, may be used as the p-vinyl phenol starting material for polymerization.

When the p-vinyl phenol used as the starting material for polymerization is purified pure p-vinyl phenol, the effect of the present invention is obtained when phenols that do not have any unsaturated side chains such as phenol, cresol, xylenol, ethylphenol, catechol, pyrogallol, hydroquinone or mixtures thereof, etc., are used as a molecular weight regulator.

The crude p-vinyl phenol obtained by dehydration of p-acetoxyphenylmethyl carbinol contains, as impurities, about 10% by weight phenol and about 5 to 20% by weight ethyl phenol, etc. The crude p-vinyl phenol obtained by decomposition of p-hydroxysuccinic acid by decarbonation contains, as impurities, about 5 to 20% by weight phenol and about 3 to 15% by weight ethyl phenol, etc. The crude p-vinyl phenol obtained by decomposition of bisphenol ethane contains, as impurities, about 50% by weight phenol, about 5 to 20% by weight ethyl phenol and about 10% by weight cresol, etc. The crude p-vinyl phenol obtained by dehydrogenation of p-ethyl phenol contains, as impurities, about 1 to less than 5% by weight phenol and cresol and about 40 to 80% by weight unreacted p-ethyl phenol.

The above crude p-vinyl phenols may be used immediately as a starting material for polymerization. If necessary, they may be used as a starting material for polymerization after reducing the amount of phenols contained as impurities or adding phenols that do not have any unsaturated side chains as an additional molecular weight regulator.

In carrying out the present invention, the phenols that do not have any unsaturated side chains are present in the polymerization reaction system in an amount from 10 to 1,000% by weight, preferably 10 to 500% by weight and more preferably 200 to 500% by weight based on the amount of p-vinyl phenol.

If necessary, molecular weight regulators other than phenols that do not have any unsaturated side chains may be used together with the phenols described in Japanese Patent Publication (unexamined) No. 44609/82, for example, (a) aliphatic, alicyclic and aromatic alcohols such as methanol, ethanol, butanol, ethylene glycol, diethylene glycol, glycerine, cyclohexanol or benzyl alcohol, etc.; (b) ketones such as acetone, methyl ethyl ketone, methyl isopropyl ketone, phorone, isophorone, cyclohexanone or acetophenone, etc.; (c) sulfone group containing compounds such as dimethyl sulfone, dibutyl sulfone or diphenyl sulfone, etc.; (d) sulfoxide group containing compounds such as dimethyl sulfoxide, dibutyl sulfoxide or diphenyl sulfoxide, etc.; (e) nitro group containing compounds such as nitromethane, nitropropane, nitrobenzene or nitrotoluene, etc.; (f) amide group containing compounds such as formamide, acetamide, N,N-dimethylformamide, N,N-dimethylacetamide or hexamethyl phosphoryltriamide, etc.; and (g) nitrile group containing compounds such as acetonitrile or propionitrile, etc.

When the above molecular weight regulators are used together with the phenols, it is preferred that the total amount of these molecular weight regulators and the phenols that do not have any unsaturated side chains is not beyond 1,000% by weight and, preferably, 500% by weight based on the amount of p-vinyl phenol.

Furthermore, the p-vinyl phenol used as the starting material for polymerization may contain up to about 20% by weight m-vinyl phenol based on the amount of p-vinyl phenol since m-vinyl phenol has remarkably lower polymerization velocity than that of the p-vinyl phenol in the process of the present invention.

Any substance may be used as the polymerization accelerator in the present invention if it accelerates polymerization of p-vinyl phenol. For example, it is possible to use various polymerization accelerators described in Japanese Patent Publication (examined) Nos. 30128/82 and 47921/82 and Japanese Patent Publication (unexamined) Nos. 44607/82, 44608/82 and 44609/82, etc.

Specific examples of the polymerization accelerators useful in the present invention include (1) cation initiators, e.g., (a) inorganic acids such as sulfuric acid, hydrochloric acid, nitric acid or phosphoric acid, etc.; (b) metal halides such as aluminum chloride, tin tetrachloride, iron chloride, vanadium oxychloride or boron trifluoride, etc.; (c) complexes such as ether complex of boron trifluoride or phenol complex of boron trifluoride, etc.; (d) aliphatic saturated monocarboxylic acids such as formic acid, acetic acid, chloroacetic acid, dichloroacetic acid, trichloroacetic acid, fluoroacetic acid, bromoacetic acid, iodoacetic acid, oxyacetic acid, methoxyacetic acid, mercaptoacetic acid, cyanoacetic acid, propionic acid, 2-oxypropionic acid, n-butyric acid, isobutyric acid, n-valeric acid, isovaleric acid, 4-keto-n-valeric acid, methylethylacetic acid, trimethylacetic acid, caproic acid, heptoic acid, caprylic acid, pelargonic acid, or capric acid, etc.; (e) aliphatic saturated polycarboxylic acids such as oxalic acid, malonic acid, succinic acid, glutaric acid, adipic acid, pimelic acid, tartaric acid or citric acid, etc.; (f) aliphatic unsaturated monocarboxylic acids such as acrylic acid, crotonic acid or methacrylic acid, etc.; (g) aliphatic unsaturated polycarboxylic acids such as maleic acid or fumaric acid, etc.; (h) aromatic carboxylic acids such as benzoic acid, hydroxybenzoic acid, methoxybenzoic acid, chlorobenzoic acid, bromobenzoic acid, iodobenzoic acid, cinnamic acid, salicylic acid, toluic acid, phthalic acid, isophthalic acid, terephthalic acid, trimellitic acid or pyromellitic acid, etc.; or (i) organic sulfonic acids such as methanesulfonic acid, ethanesulfonic acid, benzenesulfonic acid or toluenesulfonic acid, etc.; and (2) radical initiators, e.g., azoisobutyronitrile, benzoyl peroxide or ammonium persulfate, etc.

Phenol complex of boron trifluoride, sulfuric acid, hydrochloric acid, oxalic acid, chloroacetic acid, bromoacetic acid, benzenesulfonic acid and toluenesulfonic acid are preferred polymerization accelerators.

The amount of these polymerization accelerators used varies according to the kind thereof, reacting conditions to be adopted and desired molecular weight of the polymer, etc. However, the amount is generally preferred to be in the range of 0.005 to 10% by weight and, preferably, 0.01 to 1% by weight based on the amount of the p-vinyl phenol.

In carrying out the present invention, the amount of water to be present in the reaction system is determined based on (1) the desired molecular weight of the polymer; (2) the amount of phenol that does not have any unsaturated side chains used; and (3) the expected effect of controlling the formation of the low molecular weight by-products, etc., since water also serves as a molecular weight regulator. However, water is generally used in a range of 10 to 800% by weight, preferably, 20 to 200% by weight, and more preferably, 50 to 100% by weight based on the amount of the p-vinyl phenol.

When the p-vinyl phenol used as the starting material for polymerization contains water that originated in its production step, such water may be utilized, e.g., when crude p-vinyl phenol is prepared by dehydrogenation of p-ethyl phenol using water as a diluent. In this situation, if the water content is insufficient for attaining the desired object, water may be additionally added. If the water content is in excess for attaining the desired object, the excess water may be removed from the p-vinyl phenol starting material.

As to the iron added to the reaction system, it is possible to use one or more iron compounds, including (a) metallic iron, inorganic iron compounds such as iron hydroxide, iron oxide, iron chloride, iron sulfate, or iron nitrate, etc.; (b) iron salts of aliphatic carboxylic acid such as iron formate, iron acetate, iron oxalate, iron halogenoacetate, iron malonate, iron fumarate or iron citrate, etc.; (c) iron salts of aromatic carboxylic acid such as iron phthalate, iron terephthalate, iron benzoate or iron halogenobenzoate, etc.; and (d) iron salts of organic sulfonic acid such as iron benzenesulfonate or iron toluenesulfonate, etc.

Iron chloride, iron sulfate, iron nitrate, iron acetate and iron oxalate, etc., are preferred iron compounds used in the present invention.

Since it is considered that the iron compounds that are dissolved in the liquid phase polymerization reaction system comprising p-vinyl phenol, phenols that do not have any unsaturated side chains, water and the polymerization accelerator, etc., aid in attaining the desired objects of the present invention, it is necessary that at least a part of the iron compounds or metallic iron is soluble in the liquid phase polymerization reaction system.

In addition, even iron ions formed by, for example, dissolution of the iron vessel by corrosion, etc., are effective for attaining the objects of the present invention if they are present in the polymerization reaction system.

In carrying out the present invention, the amount of iron present in the polymerization reaction system should range from 3 to 500 ppm, preferably 3 to 200 ppm and more preferably 5 to 100 ppm as iron dissolving in the liquid phase based on the amount of the p-vinyl phenol. Although the upper limit of the amount of iron in the reaction system is not always restricted to the value in the above-described range, it is preferred that the upper limit is kept at a lower level because the effect of controlling the formation of the low molecular weight by-products is not improved as much and the amount of iron remaining in the p-vinyl phenol polymer increases if the amount of iron is increased. If the amount of iron present in the reaction system is lower than the lower limit of 3 ppm, the desired effect of controlling the formation of the low molecular weight by-products is not obtained.

When the resulting polymer is required to have a particularly low iron content, it is desirable to use iron compounds having a high water solubility so that the iron can be easily removed from the polymer by washing the polymer with water after the conclusion of the polymerization reaction.

Addition of iron to the polymerization system may be carried out by any method. However, it is generally desirable to add the iron compounds or metallic iron to the polymerization reaction system after dissolving or dispersing the water, phenols that do not have any unsaturated side chains, other molecular weight regulators or diluents if they are used, a mixture of two or more of them, or crude p-vinyl phenol as the starting material.

Reaction conditions such as the reaction temperature or reaction time, etc., used in carrying out the present invention can be suitably selected. Generally, the desired p-vinyl phenol polymer can be produced at a reaction temperature of 0° to 200° C. and preferably 30° to 100° C. under a pressure of atmospheric pressure to 5 kg/cm$^2$G and preferably atmospheric pressure, for a reaction time of 0.1 to 20 hours and preferably 0.2 to 10 hours.

In carrying out the polymerization reaction, diluents which are inactive to the polymerization reaction can be used according to demand. Examples of such diluents include: (a) hydrocarbons such as benzene, toluene, xylene or low boiling point petroleum fraction, etc.; (b) halogenated hydrocarbons such as chloroform, trichloroethane or chlorobenzene, etc.; and (c) carbon tetrachloride, etc.

The diluent is suitably used in an amount such that the total amount of phenols that do not have any unsaturated side chains, water, other molecular weight regulators if they are used, and the diluent, is not over 1,000% by weight based on the amount of the p-vinyl phenol.

In carrying out the present invention, the molecular weight of the resulting polymer can be easily controlled by varying the amount of phenols that do not have any unsaturated side chains, the amount of water, the amount of other molecular weight regulators and/or a diluent if they are used, the amount of polymerization accelerator, and the reaction conditions such as the reaction temperature, etc. Generally speaking, the molecular weight of the resulting polymer decreases by increasing the amount of the above-described various components or by raising the reaction temperature.

The polymerization reaction according to the present invention can be carried out by a batch process or a continuous process.

The polymerization reaction mixture obtained by the polymerization reaction according to the present invention is processed to obtain the purified polymer of the desired product by conventional methods, for example, distillation, reprecipitation or, if necessary, washing with water, etc.

The p-vinyl phenol polymer obtained by the polymerization reaction in the presence of water and iron according to the present invention has a remarkably low content of low molecular weight by-products as compared to prior p-vinyl phenol polymers obtained by a polymerization reaction in the absence of iron, though the resulting p-vinyl phenol polymer of the present invention has a basic structure which is similar to that of prior p-vinyl phenol polymers.

The presence of iron in the polymerization reaction system remarkably controls the formation of the low molecular weight by-products without having a bad influence upon vinyl polymerization of p-vinyl phenol.

Formation of the low molecular weight by-products can be controlled according to the present invention, for example, as follows: When crude p-vinyl phenol having a composition comprising 30% by weight p-vinyl phenol, 65% by weight p-ethyl phenol, 2% by weight cresol, 1% by weight phenol and 2% by weight the balance, which is obtained by dehydrogenation of p-ethyl phenol, is polymerized at 40° to 80° C., and about 0.05% by weight polymerization accelerator and about 50% by weight water based on the amount of p-vinyl phenol are added, the resulting polymer has a weight average molecular weight of about 5,000 to 10,000 and the amount of the low molecular weight by-products formed is about 8 to 15% by weight (based on the amount of the polymer).

When the crude p-vinyl phenol having the above-described composition is polymerized at a temperature higher than the above-described range or is polymerized with the addition of p-ethyl phenol to the crude p-vinyl phenol to reduce the concentration of p-vinyl phenol, a polymer having a weight average molecular weight of less than 5,000 which has many uses is produced, but the amount of the low molecular weight by-products formed increases.

On the other hand, when the crude p-vinyl phenol having the above-described composition is polymerized at a reaction temperature of 40° to 80° C. in the presence of the same amount of polymerization accelerator as described above (i.e., about 0.05% by weight based on the amount of the p-vinyl phenol) with the addition of 50% by weight of water and 5 to 10 ppm of iron compounds based on the amount of the p-vinyl phenol, the weight average molecular weight and the structure of the resulting polymer are nearly similar to those of the above-described polymer, but the amount of the low molecular weight by-products formed is 1 to 3% by weight (based on the amount of the polymer). This is a remarkably low amount of low molecular weight by-products as compared to when iron is not present in the reaction system.

Hence, the presence of iron negligibly effects the molecular weight and the structure of the resulting polymer, but it remarkably controls the formation of the low molecular weight by-products.

The present invention is illustrated with reference to the specific examples and comparative examples below. However, these examples are in no way intended to limit the present invention. In the following examples and comparative examples, all "%" are "% by weight" unless otherwise stated.

EXAMPLE 1

To 500 g of crude p-vinyl phenol, obtained by the dehydrogenation of p-ethyl phenol (composition: p-vinyl phenol 25.5%, p-ethyl phenol 69.2%, p-cresol 2.1%, phenol 0.9%, p-vinyl phenol polymer 0.5% and other unknown substances 1.8%), 50% by weight water, 10 ppm of an iron powder based on the amount of the p-vinyl phenol were added, respectively. The mixture was put in a 1 liter glass flask equipped with a stirrer and sulfuric acid was added as a polymerization accelerator in an amount of 500 ppm based on the amount of the p-vinyl phenol with stirring on a water bath. The mixture was reacted at 60° C. for 3 hours.

Upon analyzing the resulting reaction product by gas chromatography and gel-permeation chromatography, it was observed that p-vinyl phenol monomer disappeared completely and that the reaction product had a composition comprising 25.6% p-vinyl phenol polymer, 0.6% low molecular weight by-products, 68.9% p-ethyl phenol, 2.1% p-cresol, 0.9% phenol and 2.0% unknown substances. The yield of p-vinyl phenol polymer was 98.5% and the weight average molecular weight thereof was 4,000. Low molecular weight by-products were formed in an amount of 2.3% based on the amount of the p-vinyl phenol polymer.

EXAMPLE 2

When the same operation as in Example 1 was carried out, except that iron oxalate was used in an amount of 10 ppm as iron based on the amount of the p-vinyl phenol instead of the iron powder and oxalic acid was used instead of sulfuric acid, the p-vinyl phenol polymer formed had a weight average molecular weight of 4,800 and the amount of the low molecular weight by-products formed was 1.9% based on the amount of the p-vinyl phenol polymer.

EXAMPLE 3

When the same operation as in Example 1 was carried out, except that iron acetate was used in an amount of 10 ppm as iron based on the amount of the p-vinyl phenol instead of the iron powder and chloroacetic acid was used instead of sulfuric acid, the p-vinyl phenol polymer formed had a weight average molecular weight of 4,500 and the amount of the low molecular weight by-products formed was 2.0% based on the amount of the p-vinyl phenol polymer.

EXAMPLES 4–8

The same operation as in Example 1 was carried out except that ferric chloride and benzenesulfonic acid were used instead of the iron powder and sulfuric acid, respectively. The ferric chloride was added in the amounts shown in Table 1 as iron based on the amount of the p-vinyl phenol. The weight average molecular weight of the p-vinyl phenol polymer formed and the amount of the low molecular weight by-products formed based on the amount of the p-vinyl phenol polymer are shown in Table 1.

TABLE 1

|  | Example No. | | | | |
| --- | --- | --- | --- | --- | --- |
|  | 4 | 5 | 6 | 7 | 8 |
| Amount of iron added (ppm/p-vinyl phenol) | 3 | 10 | 50 | 100 | 200 |
| Weight average molecular weight of polymer | 4,700 | 4,500 | 4,600 | 4,600 | 4,500 |
| Amount of the low molecular weight by-products formed (%/polymer) | 3.2 | 2.5 | 2.0 | 1.8 | 1.7 |

COMPARATIVE EXAMPLE 1

When the same operation as in Example 1 was carried out except that the iron powder was not added, p-vinyl phenol monomer was not observed in the reaction product. The weight average molecular weight of the resulting p-vinyl phenol polymer was 4,600 and the amount of the low molecular weight by-products formed was 9.8% based on the amount of the p-vinyl phenol polymer.

EXAMPLE 9

The same operation in Example 1 was carried out except that 20% water based on the amount of the p-vinyl phenol was added, 10 ppm of ferric chloride as iron based on the amount of the p-vinyl phenol was used instead of the iron powder and 500 ppm of benzenesulfonic acid based on the amount of the p-vinyl phenol was used instead of sulfuric acid. As the result, the p-vinyl phenol monomer was not observed in the reaction product. The weight average molecular weight of the resulting p-vinyl phenol polymer was 6,000 and the amount of the low molecular weight by-products formed was 7.3% based on the amount of the p-vinyl phenol polymer.

While the invention has been described in detail and with reference to specific embodiments thereof, it will be apparent to one skilled in the art that various changes and modifications can be made therein without departing from the spirit and scope thereof.

What is claimed is:

1. A process for the production of p-vinyl phenol homopolymer which comprises polymerizing p-vinyl phenol in the presence of (a) phenols that do not have any unsaturated side chains and (b) a polymerization accelerator; wherein said polymerization is additionally carried out in the presence of water and iron wherein the amount of water present is 10 to 800% by weight based on the amount of the p-vinyl phenol and the amount of dissolved iron present is 3 to 500 PPM based on the amount of the p-vinyl phenol and wherein the amount of the phenols that do not have any unsaturated side chains is 10 to 1000% by weight based on the amount of the p-vinyl phenol.

2. A process according to claim 1, wherein the iron to be added to the polymerization reaction system is at least one member selected from the group consisting of metallic iron, inorganic iron compounds, iron salts of an aliphatic carboxylic acid, iron salts of an aromatic carboxylic acid, iron salts of an organic sulfonic acid and iron ions eluted from an iron vessel.

3. A process according to claim 1, wherein the phenols that do not have any unsaturated side chains are selected from at least one member of the group consisting of phenol, cresol, xylenol, ethylphenol, catechol, pyrogallol and hydroquinone.

4. A process according to claim 1, wherein the polymerization accelerator is at least one cationic initiator selected from the group consisting of inorganic acids, metal halides, complexes of boron trifluoride, aliphatic saturated monocarboxylic acids, aliphatic saturated polycarboxylic acids, aliphatic unsaturated monocarboxylic acids, aliphatic unsaturated polycarboxylic acids, aromatic carboxylic acids and organic sulfonic acids.

5. A process according to claim 1, wherein the polymerization accelerator is at least one radical initiator selected from the group consisting of azoisobutyronitrile, benzoyl peroxide and ammonium persulfate.

6. A process according to claim 1, wherein the amount of the polymerization accelerator present is 0.005 to 10% by weight based on the amount of the p-vinyl phenol.

7. A process according to claim 1, wherein the polymerization reaction temperature is 0° to 200° C.

8. A process according to claim 1, wherein a molecular weight regulator, other than phenols that do not have any unsaturated side chains, and/or a diluent is used.

9. A process according to claim 1, wherein the p-vinyl phenol used as a starting material for polymerization is a purified pure p-vinyl phenol and the phenols that do not have any unsaturated side chains are added as the molecular weight regulator.

10. A process according to claim 1, wherein the p-vinyl phenol used as a starting material for polymerization is crude p-vinyl phenol containing phenols that do not have any unsaturated side chains.

11. A process according to claim 1, wherein the p-vinyl phenol used as a starting material for polymerization does not contain water, and water is added separately.

12. A process according to claim 1, wherein the p-vinyl phenol used as a starting material for polymerization contains water that originates from its production step.

* * * * *